May 28, 1968 T. T. FJÄLLBRANT 3,386,048

AMPLIFIER COMPRISING NEGATIVE RESISTANCE ELEMENTS

Filed March 22, 1966

TORE TORSTENSSON FJÄLLBRANT
INVENTOR.
BY Hane and Nydick
ATTORNEYS

United States Patent Office 3,386,048

Patented May 28, 1968

3,386,048

AMPLIFIER COMPRISING NEGATIVE RESISTANCE ELEMENTS

Tore Torstensson Fjällbrant, Staborg, Fjaras, Sweden, assignor to Telefonaktiebolaget L M Ericsson, Stockholm, Sweden, a corporation of Sweden Filed Mar. 22, 1966, Ser. No. 536,367
Claims priority, application Sweden, Mar. 31, 1965, 4,129/65
4 Claims. (Cl. 330—61)

The present invention refers to an amplifier comprising a negative resistance element, as for example a parametric amplifier, to give the amplifier a resulting amplification mainly independent upon variations in the negative resistance element.

In certain amplifiers negative resistance elements are used as parametric amplifiers and tunnel diode amplifiers. To exploit non-reciprocal amplification out of such elements and to isolate the active element from the load, the element in arrangements hitherto used, is used together with so called circulator elements. However, such a use involves involves certain difficulties on account of the fact that the amplifier becomes very sensitive to variations in the active element. A little change in the negative resistance actually causes a big change in the amplification.

The invention is thus intended to obtain an arrangement by means of which a resulting amplification is obtained, mainly independent of variations in the negative resistance element. The arrangement is substantially characterized thereby that the amplifier comprises two signal ways connected between the input terminals and the output terminals, at which one of the signal ways comprises a quarter wave circuit connected in series with a non-reciprocal phase-shifter, for example arranged for a phase-shift of +90° in one of the transmission directions and for a phase-shift of —90° in the other transmission direction, and at which the other signal way comprises a differential branch, a so called magic T, in one branch of which a reactance element is connected, and in the other branch of which the negative resistance element is connected.

Figure 2:
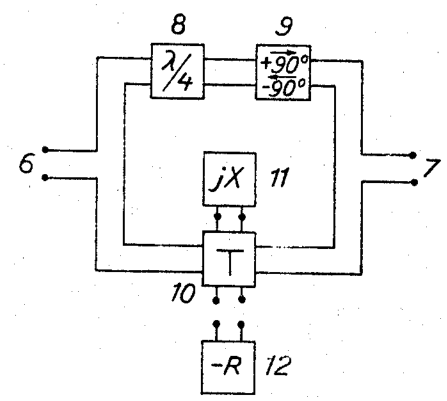
Figure 1:
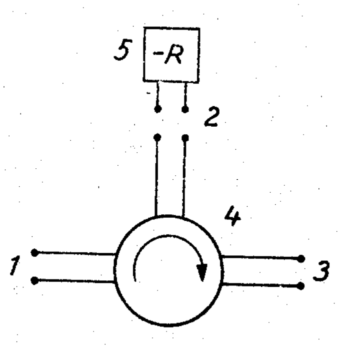
Figure 3:
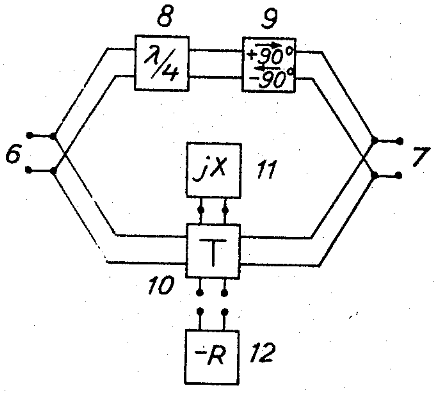
Figure 4:
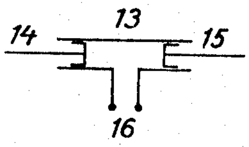

The invention will be closer described in connection with the enclosed drawing, on which FIG. 1 shows an arrangement of the kind hitherto used, FIG. 2 shows a form of embodiment of the arrangement in accordance with the invention, FIG. 3 shows another form of embodiment in accordance with the invention, and FIG. 4 shows an example of a reactance element used in the arrangements on FIG. 3 or FIG. 4.

FIG. 1 shows an arrangement of a conventional achievement. The negative resistance element 5 is used together with a circulator element 4. Such an element is characterized thereby that a signal fed into a branch 1 passes out through the branch 2, and a signal fed into the branch 2, passes out through the branch 3. The disadvantage of such an arrangement is, as is mentioned above, that the amplification becomes very dependent upon variations in the active element.

In the new arrangement in accordance with FIG. 2 and FIG. 3, however, the dependance of the amplification upon these variations in the negative resistance is considerably decreased. The arrangement comprises two signal branching ways connecting the input terminals 6 with the output terminals 7. The branching ways may be connected either in series or in parallel in accordance with FIG 3. One of these two branches comprises a quarter-wave circuit 8, connected in series with a non-reciprocal phase shifter 9. It is suitable that this one is arranged with a phase shift of +90° in one transmission direction and a phase shift of —90° in the other transmission direction. The other branch contains a differential branch 10, a so called magic T. In one branch of this differential branch the negative resistance element 12 is connected and in its other branch a reactance element 11 is connected. It is possible to connect a transformer between the negative resistance element and the differential branch.

In amplifier arrangements on wave-guide- and coaxial-cable basis the reactance element is preferably composed of two variable short-circuits as is shown in FIG. 4. This element 13, having its connection marked 16, thus comprises two short-circuits, 14 and 15 respectively, the positions of which may be varied. On account of this they may be set in such positions that a wanted reactance with a wanted frequency dependence is obtained. In amplifier arrangements for lower frequencies it is suitable that the reactance element is composed of coils and capacitors.

The advantage of variation possibilities of the value of the reactance and of the frequency dependence is that the arrangement may be adapted to different kinds of negative resistance elements. The negative resistance elements usable in practice apart from a negative resistance consist of reactance elements in series, in parallel or in a more complicated configuration. When such negative resistance elements are used in a connection arrangement in accordance with the invention it may be shown mathematically that the variable reactance element may be chosen in such a way that the resulting amplification in the arrangement becomes stable concerning variations in the negative resistance, on account of the fact that the total amplification consists of a non-reciprocal part as well as a reciprocal part, these parts counteracting each other concerning the dependence upon the value of the negative resistance.

I claim:

1. An amplifier comprising input terminals and output terminals and a negative resistance element, intended to give a resulting amplification mainly independent upon variations in the negative resistance element, said amplifier comprising two signal ways connected between said input and output terminals, one of said signal ways comprising a quarter-wave circuit connected in series with a non-reciprocal phase-shifter, the other of said signal ways comprising a differential branch, a magic T, in one branch of said differential branch a reactance element being connected, in the other branch of said differential branch said negative resistance element being connected.

2 An amplifier in accordance with claim 1 wherein said two signal ways being connected in series between said input terminals and said output terminals.

3. An amplifier in accordance with claim 1 wherein said two signal ways being connected in parallel between said input terminals and said output terimnals.

4. An amplifier in accordance with claim 1 wherein said non-reciprocal phase-shifter is arranged for a phase-shift of +90° in one of the transmission directions and for a phase-shift of —90° in the other transmission direction.

References Cited

UNITED STATES PATENTS 3,248,662 4/1966 Brownell et al. ------- 330—61

ROY LAKE, *Primary Examiner*

J. B. MULLINS, *Assistant Examiner.*